Figure 1:
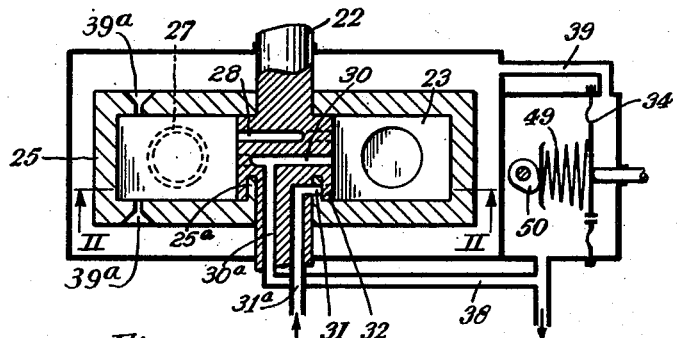

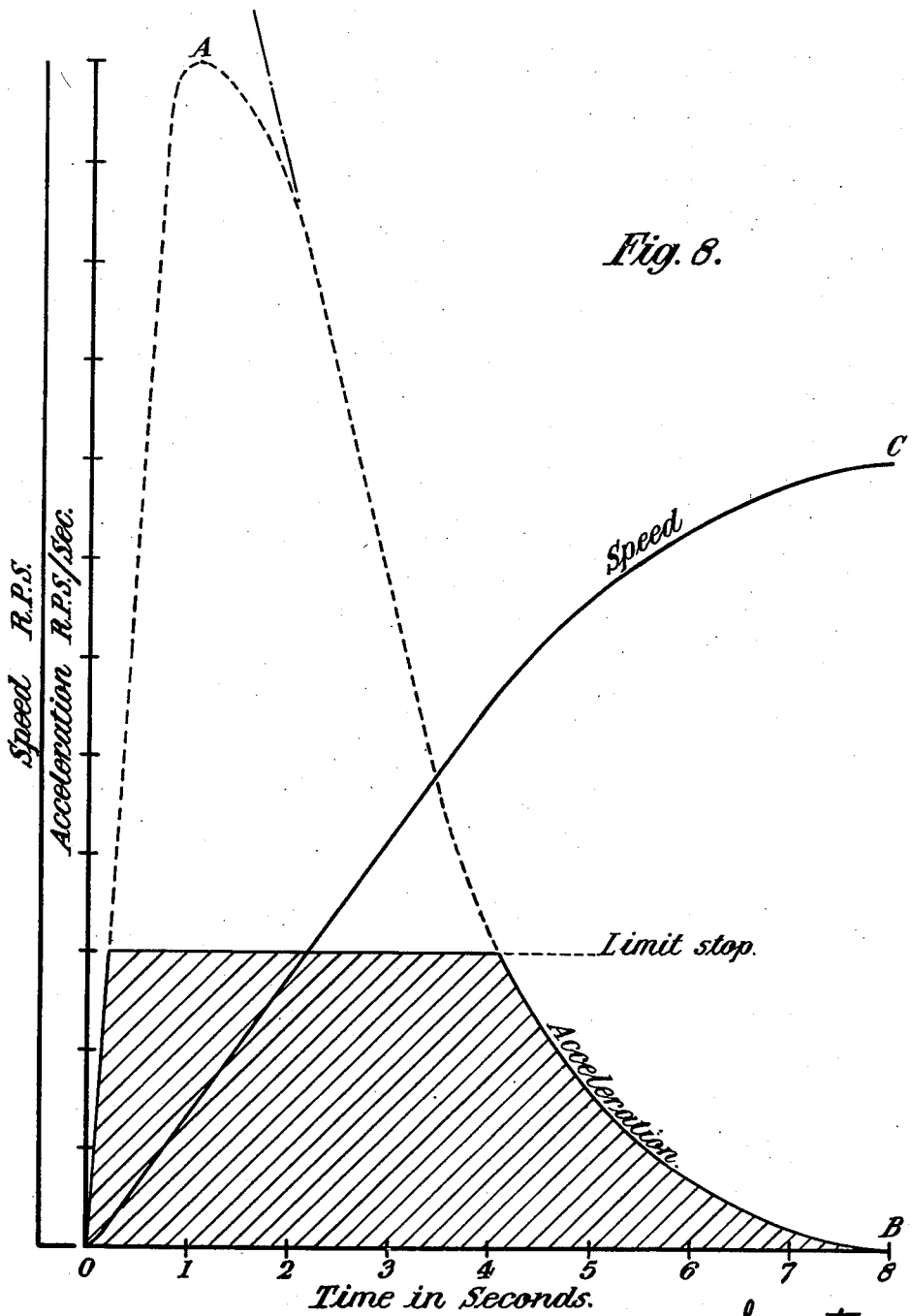

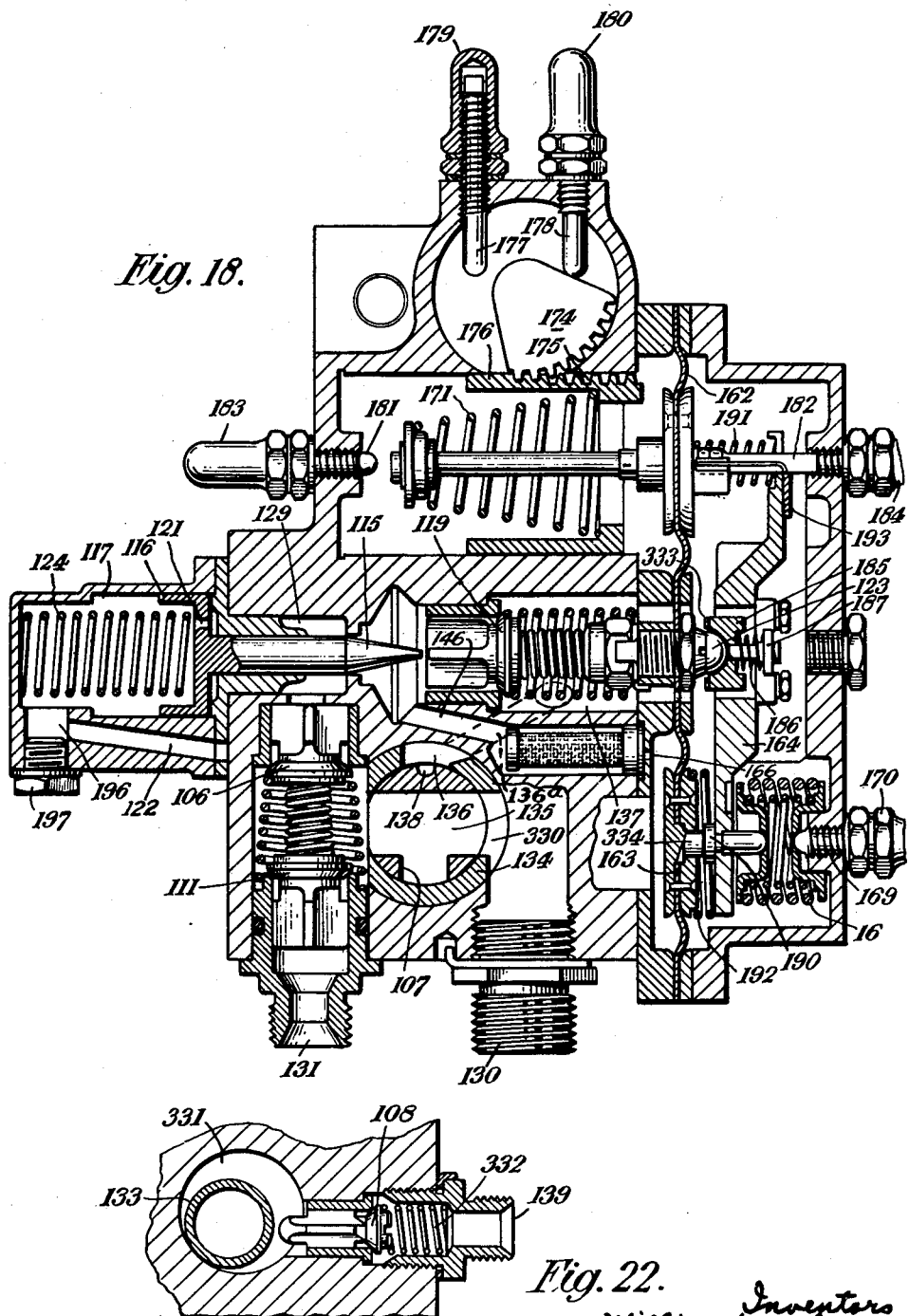

April 7, 1953 W. D. McCOURTY ET AL 2,633,830
SPEED, ACCELERATION, AND PRESSURE
CONTROLS FOR SERVOMOTOR SYSTEMS
Filed June 27, 1950 13 Sheets-Sheet 13

Patented Apr. 7, 1953

2,633,830

UNITED STATES PATENT OFFICE 2,633,830

SPEED, ACCELERATION, AND PRESSURE CONTROLS FOR SERVOMOTOR SYSTEMS

William D. McCourty, Goldthorn Park, Wolverhampton, and Stanley R. Tyler, Willenhall, England, assignors to H. M. Hobson Limited, London, England, a British company Application June 27, 1950, Serial No. 170,604
In Great Britain June 27, 1949

22 Claims. (Cl. 121—43)

Variable-speed hydraulic governors for internal combustion engines are known, comprising a diaphragm exposed to the hydraulic pressure developed by the governor and to an opposing spring pressure, which can be varied by movement of a speed-selecting member, a servomotor, comprising a servo piston movable in a cylinder and serving, when so moved, to vary the engine speed (e. g. by adjusting the flow of fuel thereto) and a control valve coupled to the diaphragm and serving, when displaced, as the result of selection of a new engine speed by variation of the load on the spring, to effect movement of the piston in its cylinder to an appropriate new position.

A governor of this kind has, moreover, the disadvantage that, due to the lag in response of the engine to movement of the servo piston, the latter is liable to overshoot the position corresponding to the newly selected speed, with the result that the engine speed will be temporarily raised to a value beyond that selected and then changed by the controlling action of the governor to a value short of that selected. The engine speed will accordingly only reach the selected value after one or more oscillations about that value.

It is the object of this invention to provide a governor such that the tendency to overshoot the selected speed is reduced.

The invention provides, in combination with a variable speed governor body, a speed-changing device for varying the speed of the governed body, a control member movable in opposite directions from a neutral position to cause sympathetic movement of the speed-changing device, a speed-selecting member for applying to the control member a load which varies in accordance with the position of the speed-selecting member and a governor for applying to the control member a force acting in opposition to the load applied by the speed-selecting member, characterised in that the force exerted by the governor comprises a component, varying with the acceleration of the governed body and increasing as the acceleration increases, and another component determined by the speed of the governed body and increasing with increase in the speed.

When, therefore, a new speed is selected the governor at once applies, in response to the acceleration of the governed body, a component of restoring force to the control member, so reducing the tendency of the governed body to overshoot and rendering the governor more stable.

The invention includes a hydraulic governor, comprising a shaft adapted to be driven by a body to be governed, a vane fixed to the shaft, a flywheel free on the shaft and having therein a liquid-filled cavity accommodating the vane, the vane being normally maintained central in the cavity, a pressure inlet which is arranged to open, on acceleration of the shaft, to admit pressure to the portion of the cavity in advance of the vane, a pressure sensitive device exposed to liquid pressure in the cavity so as to be subjected to a component of hydraulic pressure which increases with the speed of the shaft and to a further component of hydraulic pressure which increases with the acceleration of the shaft, a spring for normally maintaining said pressure sensitive device in neutral position against the action of the hydraulic pressure, means, responsive to movement of the pressure sensitive device from neutral position, for effecting sympathetic change in the speed of the governed body, and a manually operable speed-selecting member for varying the load applied by the spring to the pressure sensitive device.

The invention includes an alternative form of hydraulic governor, which comprises a centrifugal impeller arranged to be driven by the governed body, a casing mounted to rotate with the impeller, a weight freely rotatable within the casing, a diaphragm supported by the casing and enclosing behind it a cavity in the casing, an inlet for the flow of pressure liquid to said cavity, an outlet in the casing for allowing liquid to flow from the cavity to the interior of the casing and thence to exhaust, a valve operable on relative movement of the weight and casing to decrease the effective area of the outlet during periods of acceleration and to increase it during periods of deceleration, a spring between the weight and casing for establishing a datum hydraulic pressure difference across the diaphragm, and mechanism responsive jointly to the impeller tip pressure and to the pressure in the cavity for adjusting the speed of the engine so as to counteract changes in said pressures.

Figure 2:
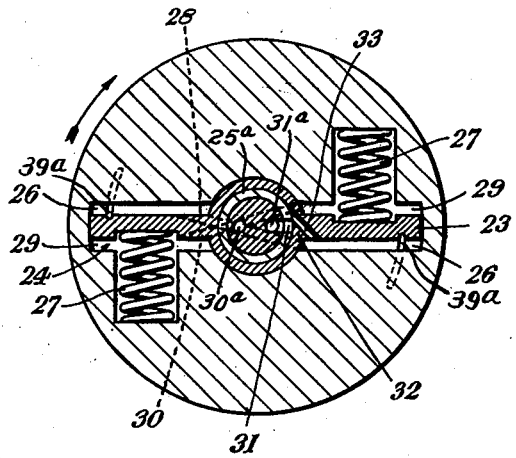
Figure 3:
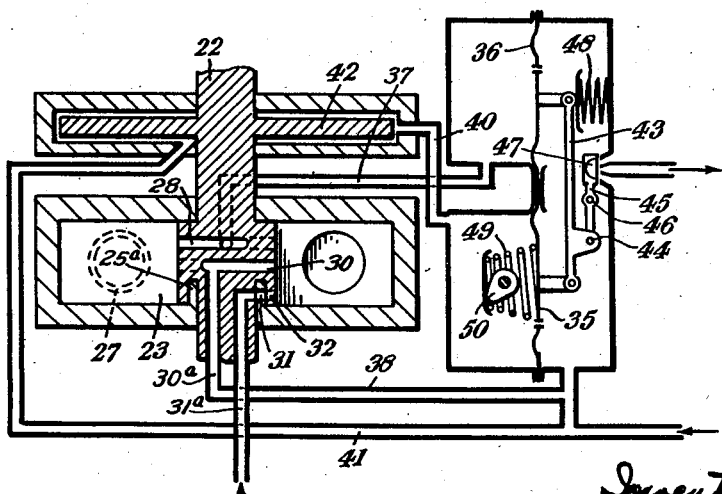
Figure 4:
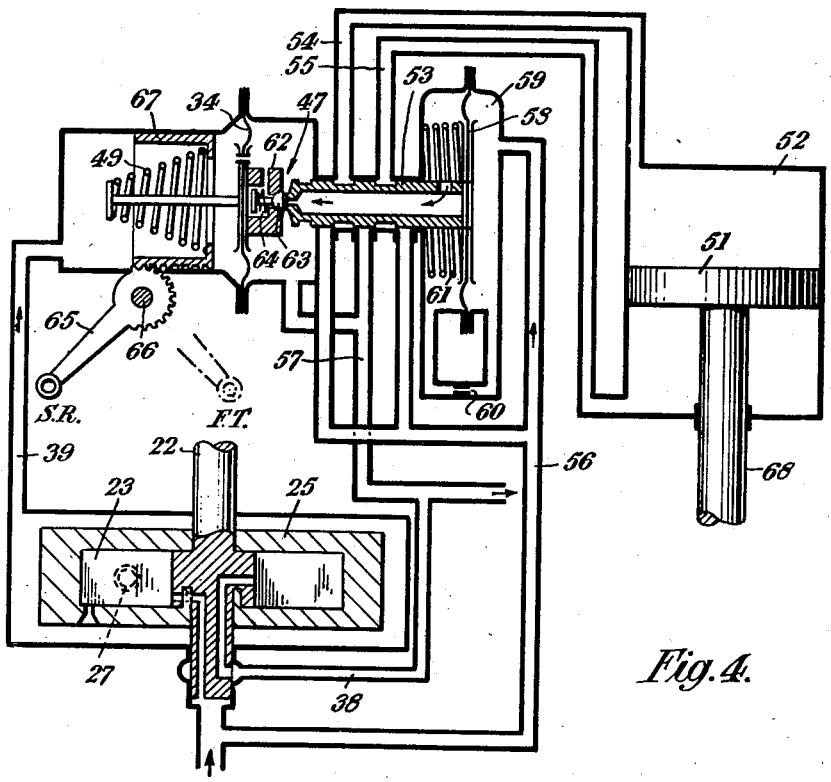

Various forms of hydraulic governor according to the invention will now be described in detail, by way of example, with reference to the accompanying drawings, in which:

Figs. 1 and 2 are diagrams, drawn respectively in planes intersecting, and at right angles to the axis of the governor shaft, and showing an inertia wheel type of governor, Fig. 2 being a section on the line II—II in Fig. 1, Fig. 3 is a view, similar to Fig. 1, of a modified form of inertia wheel governor, Fig. 4 is a diagram showing one specific application of a governor of the kind shown in Fig. 1, namely to the control of the constant speed unit of an airscrew.

Figure 7:
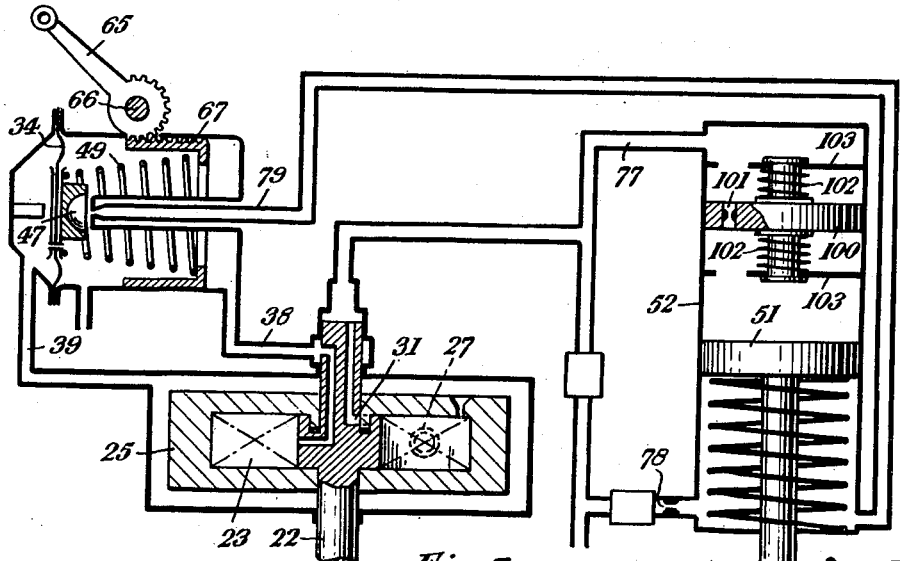
Figure 5:
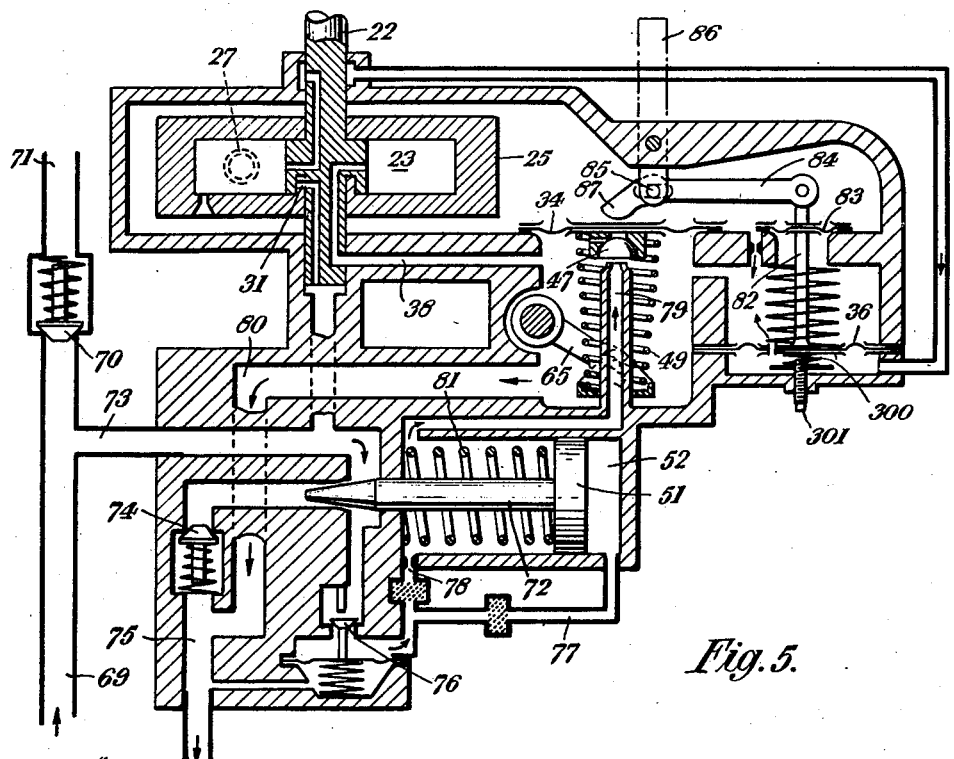
Figure 6:
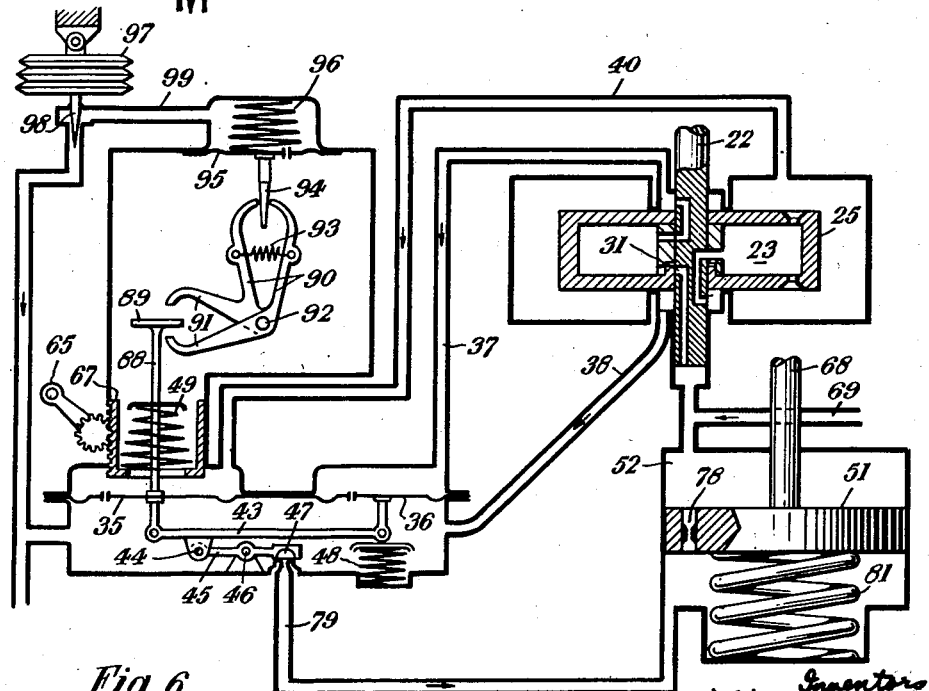
Figure 9:
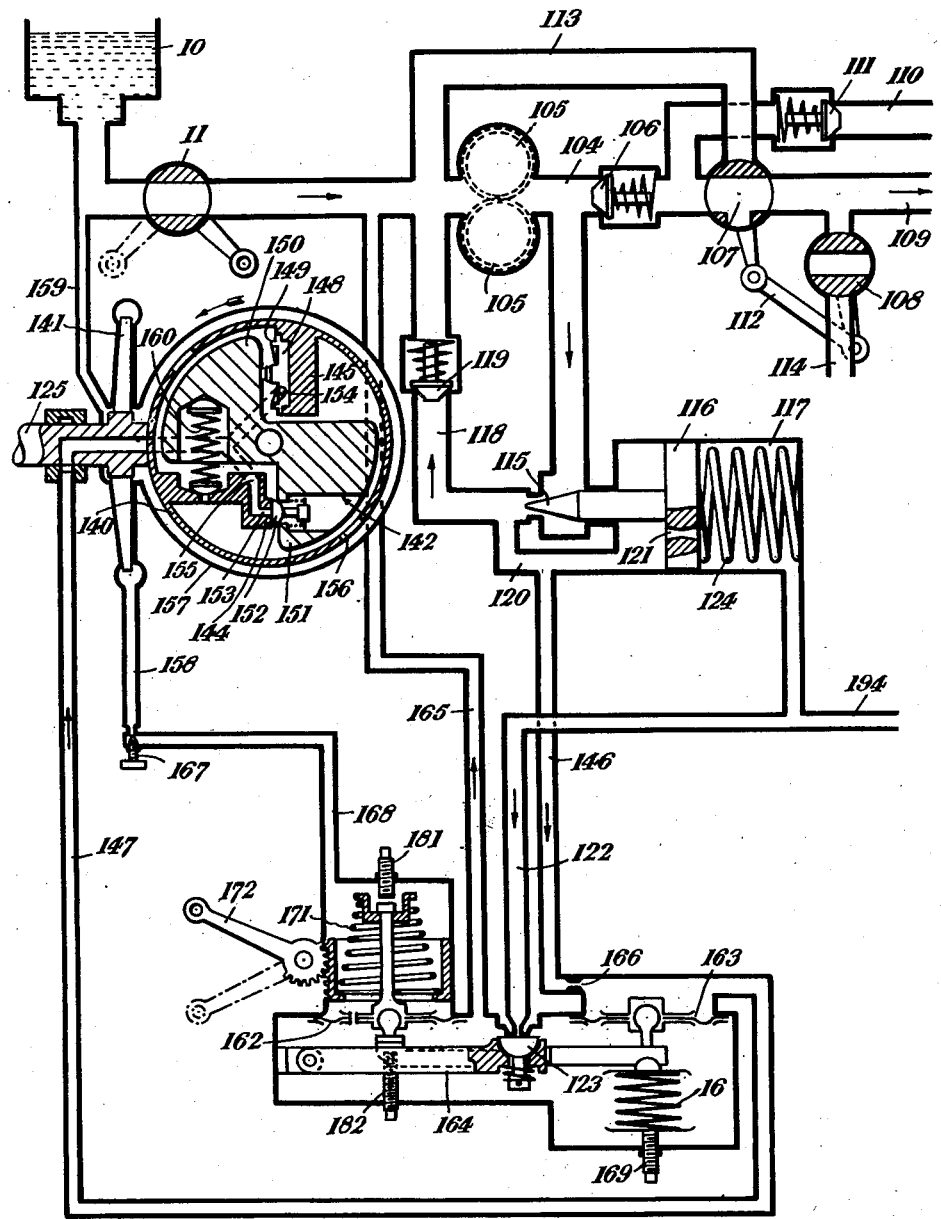
Figure 11:
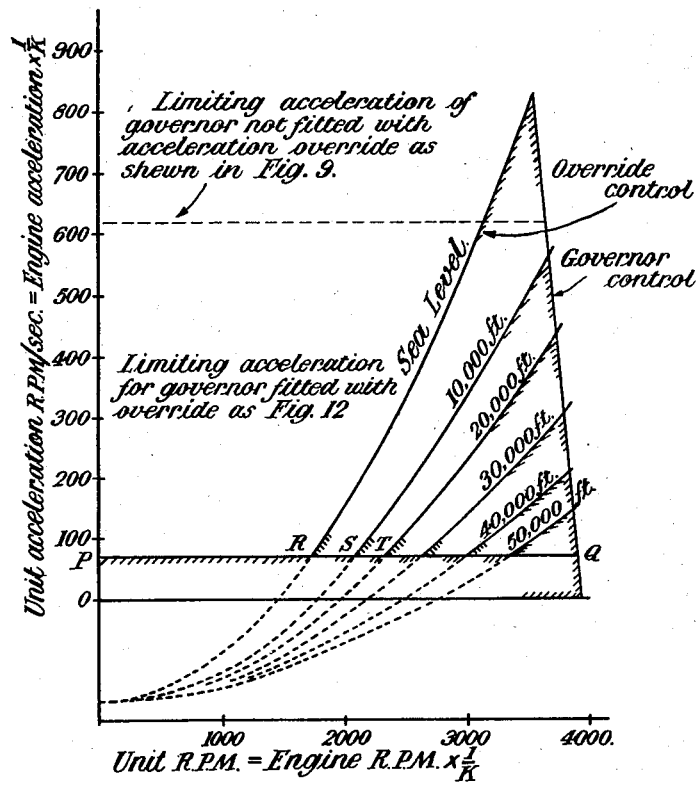
Figure 10:
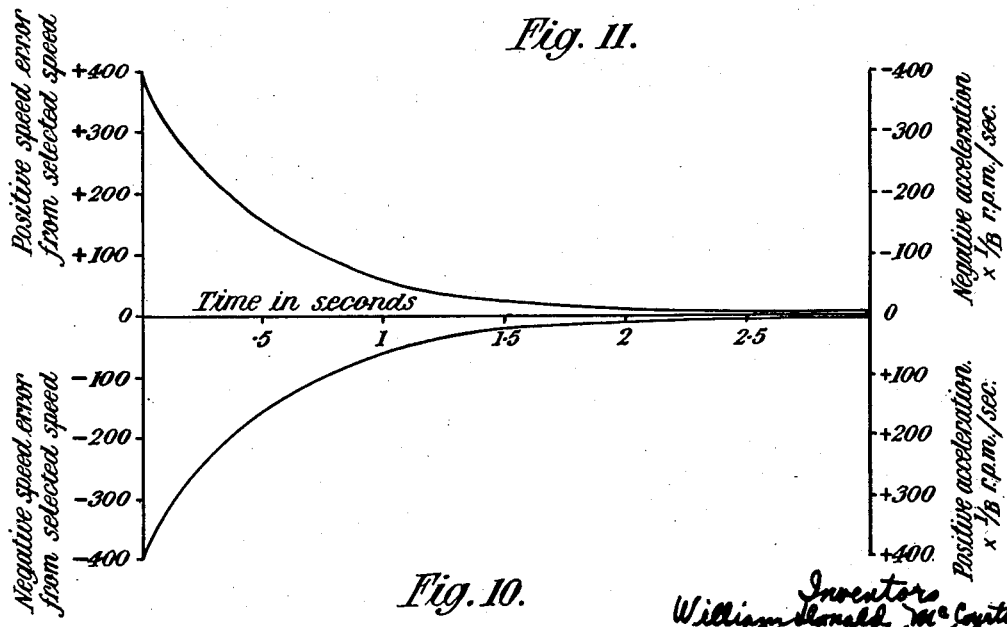
Figure 12:
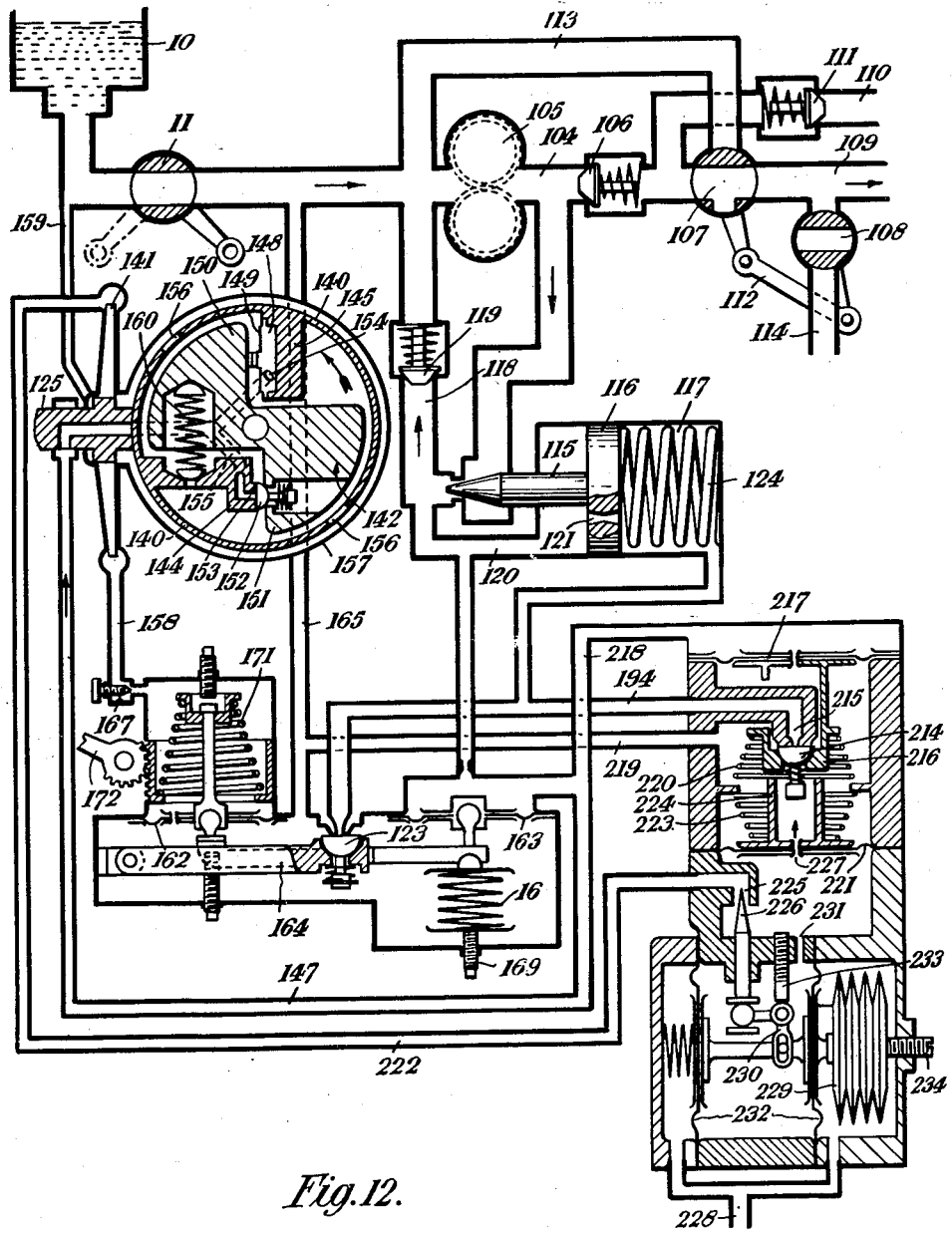
Figure 13:
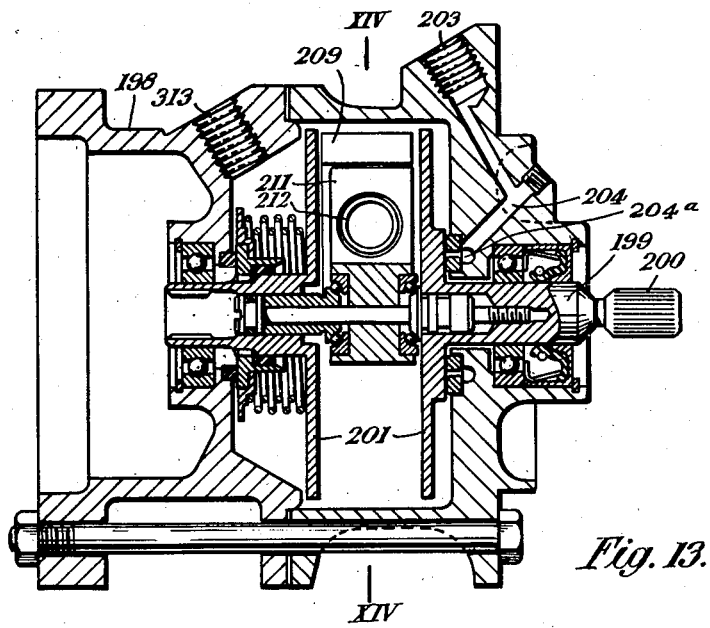
Figure 14:
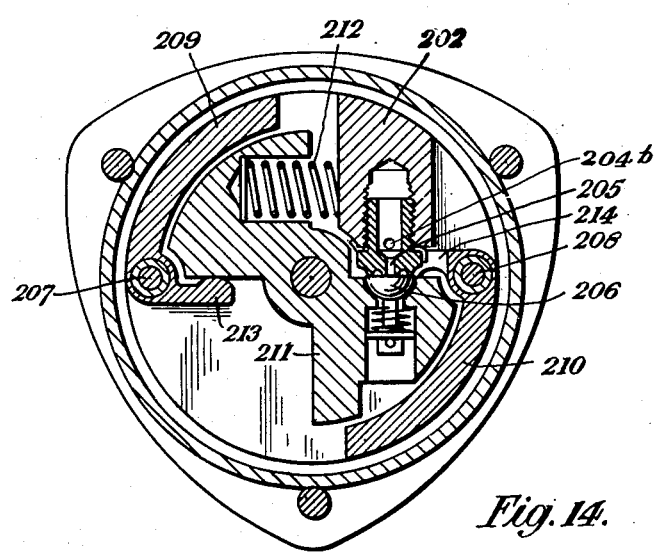

Fig. 5 is a diagram showing the application of a governor of the kind shown in Fig. 1 to the control of the flow of fuel to a gas turbine engine, Fig. 6 is a diagram showing a similar application of the governor according to Fig. 1, with the provision of acceleration limiting stops, Fig. 7 is a diagram showing a free-piston override for the governor, Fig. 8 is a graph showing the performance of a governor of the kind shown in Figs. 1–7, Fig. 9 is a diagram showing an alternative type of hydraulic governor, embodying a centrifugal impeller and associated fly weight, applied to the control of the fuel flow to a gas turbine engine installation for aircraft, Figs. 10 and 11 are graphs indicating certain characteristics of this type of governor, when fitted with the override device shown in Fig. 12, Fig. 12 is a diagram showing the installation of Fig. 9 but with the addition of an accelerating limiting override device, Fig. 13 is a vertical section through another form of override device, Fig. 14 is a section on the line XIV—XIV in Fig. 13.

Figure 15:
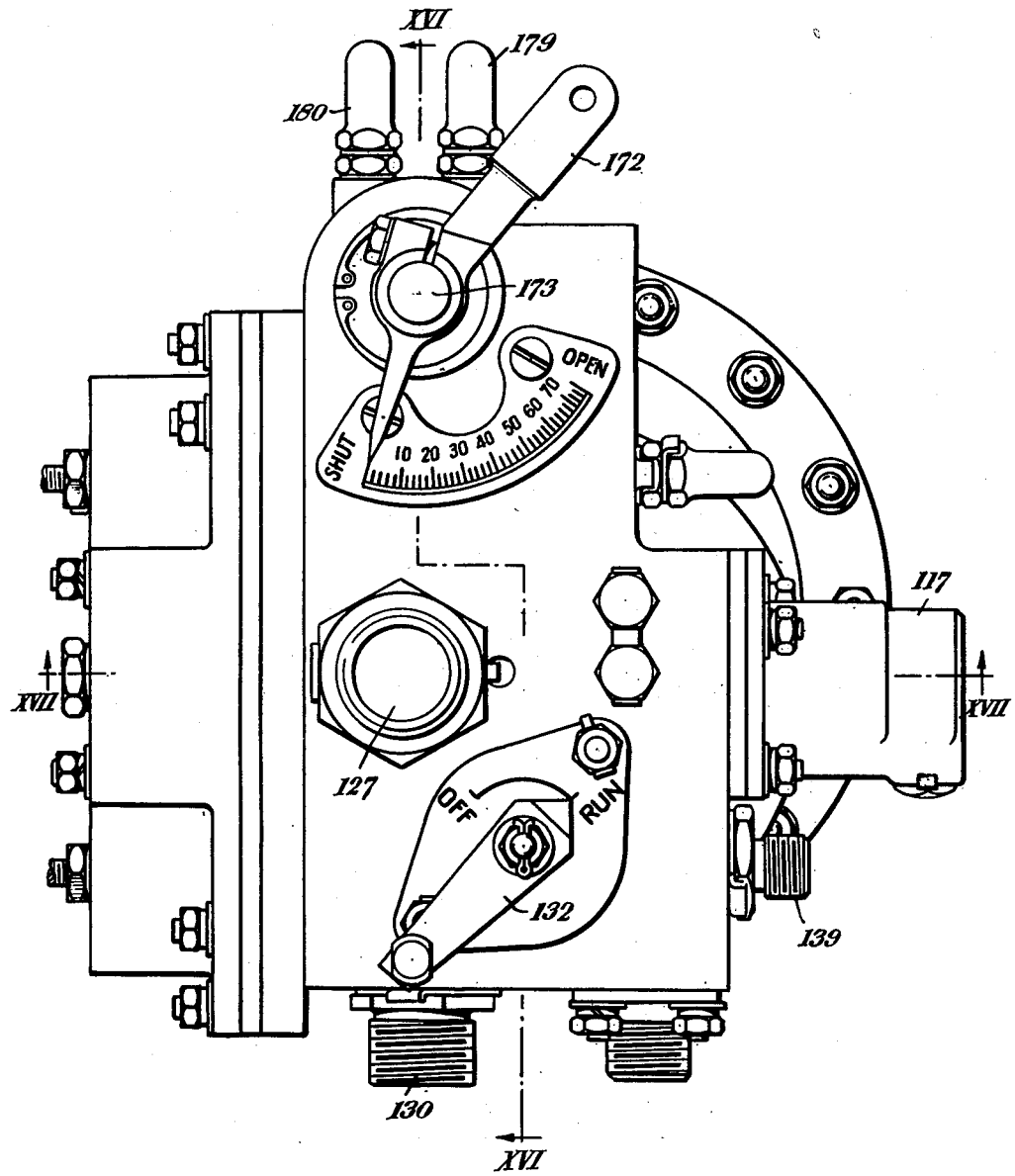
Figure 16:
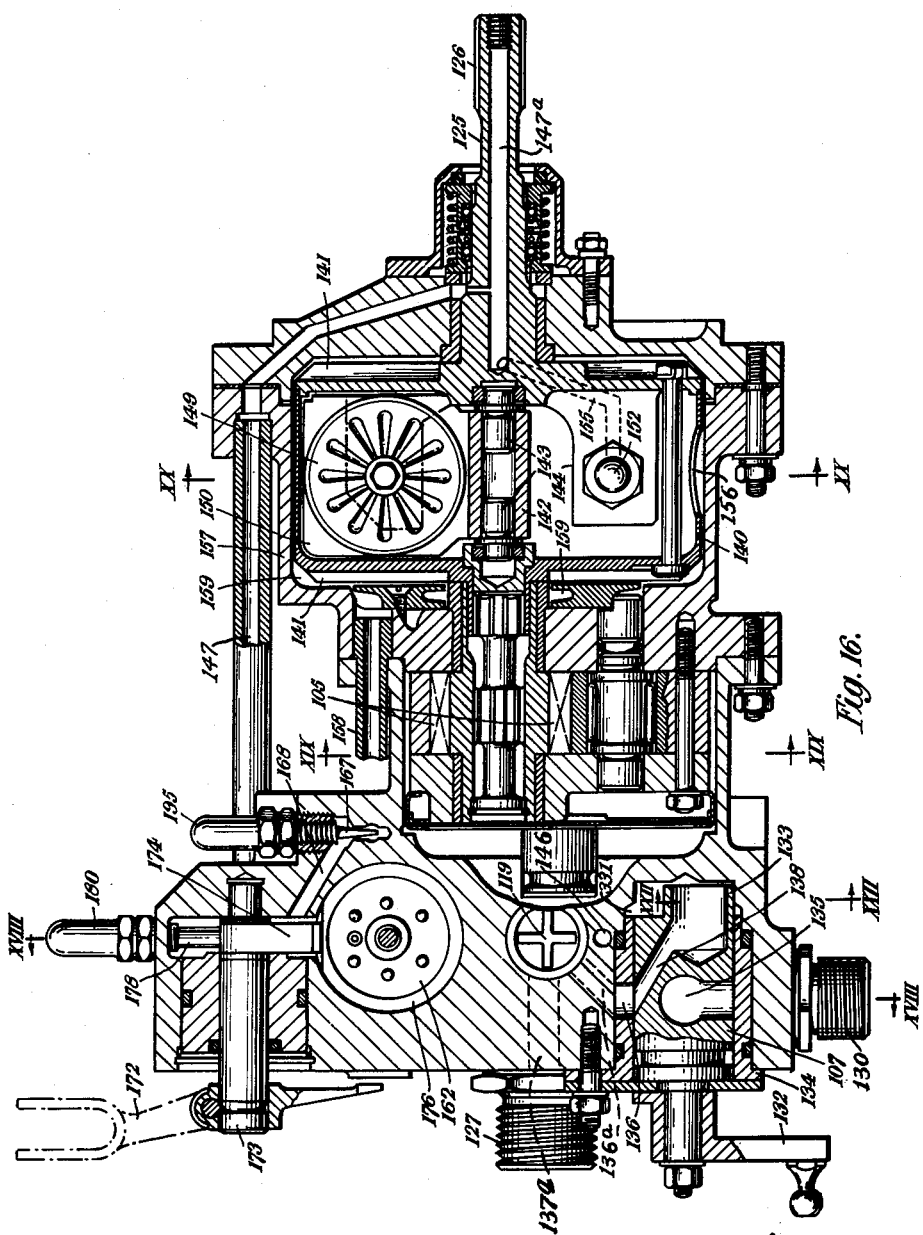
Figure 17:
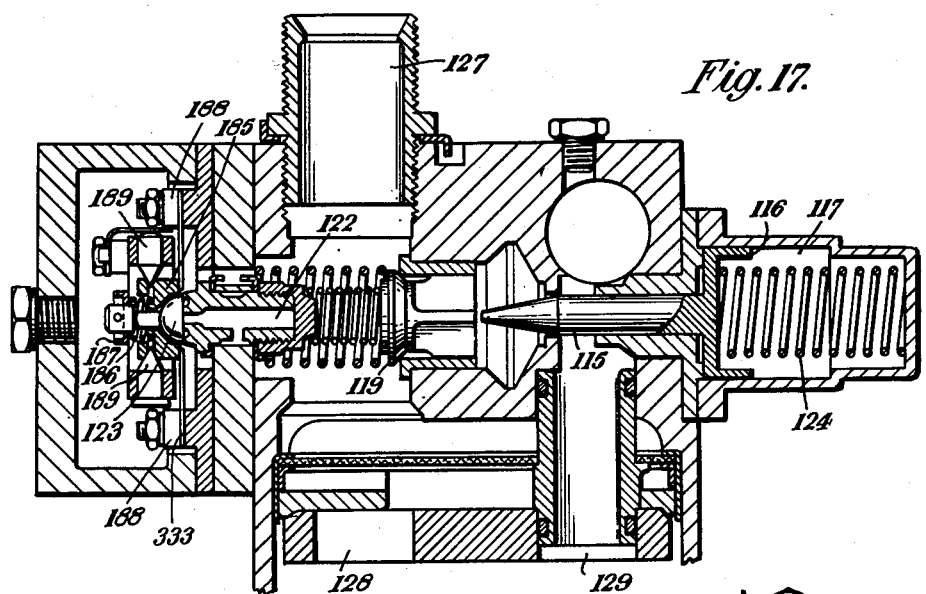
Figure 21:
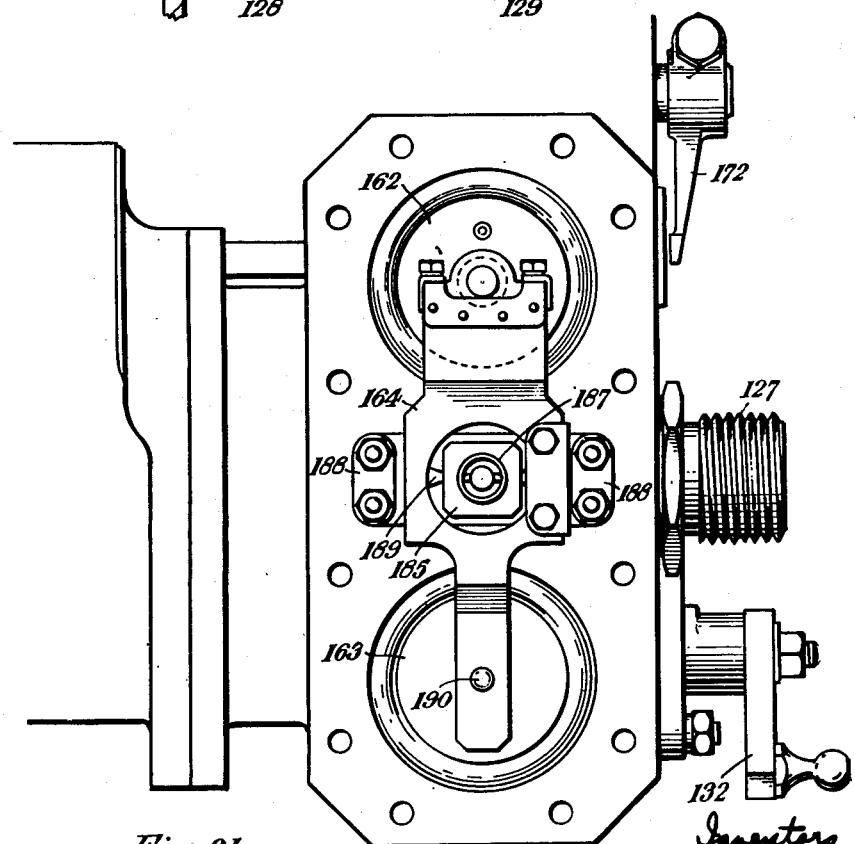
Figure 19:
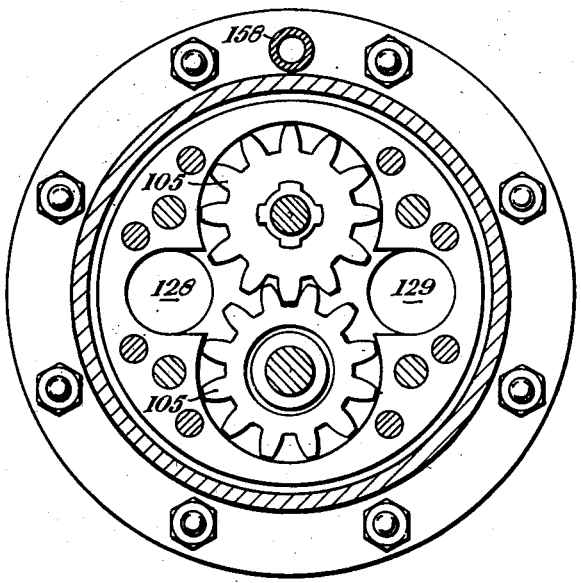

Fig. 15 is an end elevation of a practical form of the governor shown in Fig. 9, Figs. 16 and 17 respectively are sections on the lines XVI—XVI and XVII—XVII in Fig. 15, Figs. 18–20 are respectively sections on the lines XVIII—XVIII, XIX—XIX and XX—XX in Fig. 16, Fig. 21 is a view, looking from the left-hand side of Fig. 15 and with the side cover plate removed, and Fig. 22 is a section on the line XXII—XXII in Fig. 16.

Like reference numerals indicate like parts throughout the figures.

The basic principle of the inertia wheel type of governor shown in Figs. 1–8 will be first explained with reference to Figs. 1 and 2.

On a shaft 22, driven by an engine or other body to be governed, is fixed a vane 23, which projects from both sides of the shaft. The two limbs of the vane 23 are accommodated in cavities 24 in a flywheel 25 which is rotatably mounted on the shaft 22. The cavities 24 are filled with liquid and the vane is normally balanced against the liquid pressure acting in the high pressure sides 26 of the cavities 24 by springs 27. The high pressure sides 26 of the two cavities are connected by a passage 28 and the low pressure sides 29 of the two cavities are connected by a passage 30.

Liquid under pressure is admitted through a passage 31ª in the shaft 22 to an inlet port 31 in a boss 25ª on the flywheel. When the vane 23 and flywheel 25 are running at the same speed, the port 31 is closed by a projection 32 on the boss of the vane. If the engine tends to accelerate, the vane 23 will overrun the flywheel 25 and the projection 32 will move from sealing position and allow liquid to flow, from the inlet passage 31, through a passage 33 to the high pressure sides 26 of the cavities, thus tending to accelerate the flywheel.

Such a governor will, when the engine accelerates, develop components of hydraulic pressure which are responsive to speed and to acceleration. These components of hydraulic pressure may be applied, as shown in Fig. 1, to a single diaphragm 34, linked as later described to the control valve of a hydraulic servomotor for controlling the speed of the engine, or they may be separately applied, for the purpose of achieving the same result, to separate diaphragms 35, 36 as shown in Fig. 3.

The speed and acceleration responsive components of hydraulic pressure may be taken from the governor in various ways by making the following alternative connections between the diaphragm or diaphragms and the cavities in the flywheel:

(1) Acceleration component only: This is obtained, as shown in the case of the diaphragm 36 in Fig. 3, by connecting the pressure side of the diaphragm to the root of the pressure side of the vane 23, as indicated by the passage 37 communicating with the passage 28, and the exhaust side of the diaphragm to the root of the exhaust side of the vane 23, as indicated by the passage 38, communicating via a passage 38ª with the passage 30. The pressure difference across the root of the vane will then alone be effective on the diaphragm 36, and this varies with acceleration and is independent of speed.

(2) Speed component only: This may be obtained by connecting the pressure side of the diaphragm to the tip of the pressure or exhaust side of the vane and the exhaust side of the diaphragm to the root of the pressure or exhaust side of the vane. The pressure difference between the two ends of the pressure or exhaust side of the vane, which is a function of speed only and not of acceleration, will then be effective on the diaphragm.

(3) Speed and acceleration together: This is obtained as indicated in Fig. 1, by connecting the pressure side of the diaphragm 34 to the tip of the pressure side of the vane, as indicated by the passage 39 and the pressure balance slots 39ª, and the exhaust side of the diaphragm to the root of the exhaust side of the vane, as indicated by the passage 38. The pressure difference across the diaphragm 34 will then depend both on the pressure difference between the root and tip of the vane 23, which varies with speed, and the pressure difference across the root of the vane, which varies with acceleration.

When the third method of connection is adopted, a single diaphragm may be used, as shown in Fig. 1, but when the speed and acceleration components are separately picked up a pair of diaphragms will be used, one responsive to each component and both linked to a single control valve.

Where two diaphragms are so employed, the speed component need not be picked up from the flywheel but can, as an alternative, and as shown in Fig. 3, be picked up by establishing connections 40, 41 to opposite sides of the speed responsive diaphragm 35 from the tip and eye of a centrifugal impeller 42 mounted on the shaft 22 carrying the vane, or on a shaft geared to that shaft. The diaphragms 35, 36 are linked by a beam 43, pivoted at 44 to a lever 45 mounted on a fixed pivot 46 and carrying the control valve 47 of a hydraulic servomotor, which operates to control the speed of the governed body as later described. The acceleration sensitive diaphragm 36 is loaded by a spring 48 and the speed sensitive diaphragm 35 is loaded by a spring 49, the load of which is adjustable by means of a cam 50.

As an alternative to providing the vane 23 with springs 27, these may be omitted and the port 32 made double acting so that, on deceleration, the vane 23 will, by lagging behind the flywheel 25, allow pressure to be admitted to the low pressure sides 29 of the cavities in the flywheel, Fig. 6.

The flywheel-type hydraulic governor shown in Figs. 1–3 is particularly suitable for use with internal combustion engines, especially gas turbine engines, and some applications of this use will now be described.

The first application, shown in Fig. 4, is to the case of an internal combustion engine driving a constant speed airscrew. The pitch of the blades is controlled by a hydraulic servomotor, comprising a piston 51 and cylinder 52 controlled by a relay valve 53 which is movable, from the neutral position shown, to effect, through lines 54, 55, alternative connections between opposite ends of the cylinder 52 and a pressure line 56 and return line 57. The relay valve 53 is connected to a diaphragm 58 disposed in a chamber 59 having a passage 60 affording a restricted flow for liquid from one side of the diaphragm 58 to the other. A spring 61 acts on the low pressure side of the diaphragm 58 and liquid flows from this side of the diaphragm through the interior of the relay valve 53 and out to the exhaust side of the governor diaphragm 34, the flow out of the relay valve being controlled by a control valve 47 attached to the governor diaphragm 34. This valve 47 comprises an abutment 62, attached to the governor diaphragm, and having a flat surface opposite the end of the relay valve 53, and a half ball valve 63 loaded by a spring 64. The governor diaphragm 34 is loaded by a spring 49 and the pressure difference across it, developed by connecting its high pressure side through line 39 to the tip of the pressure side of the vane 23 and its exhaust side through line 38 to the root of the exhaust side of the vane, normally balances the pressure of the spring 49.

If the engine speed deviates from the selected value, the governor diaphragm 34 will move to increase or reduce the area of the outlet from the relay valve 53, so causing the diaphragm 58 to move the relay valve 53 and cause the servo piston 51 to adjust the blade pitch in the direction to return the engine speed to the selected value, the movement ceasing by reason of return of the governor diaphragm 34 and relay valve 53 to their initial position.

A speed-selecting lever 65, movable about a pivot 66, has teeth meshing with rack teeth on a sleeve 67 constituting an abutment for the spring 49 and, when moved from its slow running position S.R. towards its full throttle position F.T. to select a higher speed, the lever 65 compresses the spring 49 and causes the diaphragm 34 to move to the left to increase the flow from the open end of the relay valve 53. The resulting movement to the left of the relay valve 53 causes the servo piston 51 to fall thereby actuating pitch changing mechanism, not shown, coupled to the piston rod 68 to change the blade pitch to a value corresponding to a higher engine speed. Immediately, however, the engine begins to accelerate the resulting movement of the vane 23 in relation to the flywheel 25 develops a hydraulic pressure tending to return the governor diaphragm 34 to its original position. As the engine speed increases more of the pressure drop across the governor diaphragm is supplied by the speed-responsive component of the diaphragm-controlling pressure differential, leaving less supplied by the acceleration-responsive component. This means that as the engine speed approaches the newly selected speed the rate of acceleration decreases until, when the desired speed is reached, the acceleration is zero and, therefore, steady running conditions are obtained.

The characteristic of an installation of this type is shown in Fig. 8. On movement of the lever 65 to accelerate the acceleration increases rapidly as indicated by the line OA, the slope of the line being due to friction and the inertia of the system. Thereafter, the acceleration gradually decreases, as indicated by the curve AB. Meanwhile, the speed gradually increases, as indicated by the curve OC, to the selected final value represented by BC.

When the speed-selecting lever 65 is moved in the direction to decelerate, the load on the spring 49 is reduced, the diaphragm 34 and relay valve 53 moving to the right and the servo piston 51 rising in its cylinder to reduce the engine speed.

While reference has been made to movement of the servo piston 51 in Fig. 4 actuating the pitch-changing mechanism of a constant speed airscrew, the installation of Fig. 4 may be used to control the engine speed in other ways. Thus, for example, the servo piston 51 may be utilized to control the delivery of a variable stroke fuel pump, or to vary the amount of fuel supplied to the engine from a constant stroke fuel pump.

The control valve linked to the governor diaphragm may, as later described, control the engine speed by effecting movement of a servo piston, arranged to regulate the flow of fuel to the engine either by adjusting the position of a needle valve controlling the fuel flow or by adjusting the delivery of a variable delivery pump. In this case the above-described relay valve can be omitted, and the servo piston may have a restriction allowing fuel to flow through it from the high pressure end of the cylinder and thence to the exhaust side of the governor diaphragm through the control valve, the piston being loaded by a spring acting on its low pressure side. The control valve will then, owing to the effect of the rate of the spring, assume slightly different controlling positions for each selected speed.

It has been explained above that, where use is made of the known type of governor which applies to the diaphragm a restoring force which is dependent on speed only, the servo piston is liable, during period of acceleration, to travel to the end of its stroke, on movement of the control valve from controlling position, due to the lag in response of the engine. With the governor according to the invention, however, this tendency is prevented due to the acceleration-responsive component of restoring force which, even though the servo piston may initially overshoot the position corresponding to the newly-selected speed, will, by returning the diaphragm and control valve towards controlling position at an early stage, cause the servo piston to return to its correct position, should it have overshot it, before the engine can attain a speed beyond that selected.

In the case of a gas turbine, in which the speed is regulated by the amount of fuel fed to the engine, some form of overriding device will generally be desirable in order to prevent overfueling during acceleration and/or weak mixture blow-out on deceleration.

This overriding device may take one of a number of forms, for example:

(a) When the control operates a variable delivery pump a stop could be incorporated in the pump so as to limit the effective stroke. The position of this stop could be arranged to vary with R. P. M., air intake pressure, air intake temperature, turbine temperature, or other variable factors.

(b) A fuel/air ratio control could be arranged to limit the effective stroke of the pump or spill excess fuel as necessary, this control being responsive to the pressure dependent upon the weight of air passing through the system.

(c) A control sensitive to jet velocity and/or jet pipe temperature, could act as the override.

Various forms of governor according to the invention, in which the servo piston controls the rate of flow of fuel to the engine and which incorporate an override within the governor itself will now be described.

In the arrangement of Fig. 5, fuel is pumped to a gas turbine along a pipe 69 and thence, through a pressure maintaining valve 70, to a pipe 71 leading to the burners. The quantity of fuel supplied to the engine is controlled by a needle valve 72 attached to the servo piston 51 and controlling the amount of fuel spilt back to the suction side of the pump through a passage 73, a pressurising valve 74 and a passage 75. Fuel passing the needle valve 72 passes through a pressure reducing valve 76 and thence through a conduit 77 to the high pressure end of the servo cylinder 52. Fuel also passes through a restricted orifice 78 to the low pressure end of the cylinder 52 and thence, through a pipe 79, the outlet area of which is controlled by the control valve 47, to the low pressure sides of the two diaphragms 34, 36 and thence via a passage 80, to the passage 75. The servo piston 51 is balanced against the pressure difference across it by a spring 81.

As will readily be understood, movement of the lever 65 to increase the load applied by the spring 49 to the diaphragm 34 will open the valve 47, thereby causing the servo piston 51 to move to the left, closing the needle valve 72 and increasing the flow of fuel to the engine. Movement of the lever 65 in the opposite direction will close the valve 47, and cause the servo piston 51 to move to the right and decrease the fuel flow to the engine.

In the arrangement of Fig. 5, the diaphragm 34 is, as in the case of Fig. 1, exposed to both the speed and acceleration components of restoring force derived from the flywheel. A diaphragm 36 responsive to acceleration only, is coupled by a rod 82 to a third smaller diaphragm 83 exposed, like the diaphragm 34, to the combined pressure differential. This rod 82 is pivoted to the end of a lever 84, pivoted on an adjustable pivot 85 carried by a pivoted lever 86 which may be displaced, to vary the position of the pivot 85, by an altitude-responsive capsule, not shown. The lever 84 carries a pad 87 located at the high pressure side of the main diaphragm 34. A spring 300, the pressure of which is adjustable by a screw 301, bears against the underside of the diaphragm 36.

This arrangement does not limit the weakening of the mixture obtainable on deceleration. When, however, the pilot's lever 65 is moved in the direction to accelerate, the control valve 47 opens and the acceleration component, acting on the underside of the diaphragm 36, applies a direct force on the main diaphragm 34, via the pad 87, in the direction to close the control valve 47, so limiting the extent to which the servo piston 51 can enrich the mixture. With this arrangement the maximum acceleration varies with the square of the speed. The altitude-responsive capsule varies the position of the intermediate pivot 85 of the lever 84 and therefore the amount of force in the valve-closing direction which can be exerted by the pad 87.

In the arrangement shown in Fig. 6, as in the case of Fig. 3, the control valve 47 is linked to two separate diaphragms, viz. a diaphragm 35 loaded by the adjustable spring 49 and balanced against this, through connections 40, 38, by a pressure differential determined by speed only, and a diaphragm 36 loaded by a spring 48 and balanced against the spring pressure, through connections 37, 38 by a pressure differential determined by the acceleration only. The first diaphragm 35 may be coupled to the flywheel 25 by the connections described above, or may receive its pressure differential, as in the case of Fig. 3, from a centrifugal impeller mounted on the vane shaft 22.

The two diaphragms 35, 36 are connected to opposite ends of the link 43 pivoted intermediately of its length at 44 to one end of the lever, which is pivoted centrally on a fixed pivot 46 and carries the control valve 47 at its other end.

The diaphragm 35 carries, on its pressure side, a rod 88 fitted with a collar 89 movable between stops 91 carried on a pair of scissor links 90, pivoted together at 92. The remote ends of the links 90 are held by a spring 93 against a needle 94 carried by a third diaphragm 95, loaded by a spring 96 and subjected through the connections 40, 38 to a pressure differential varying with speed and ambient pressure. As the speed increases, the diaphragm 95 responds by drawing the needle 94 away from the ends of the links 90, enabling these ends to close and increasing the clearance between the stops 91 constituting the other ends of the links 90.

When a higher speed is selected, the increased compression of the spring 49 acting on the diaphragm 35 moves the linkage 43, 45, to close the control valve 47, causing the servo piston 51 to move up to actuate, through its piston rod 68, a variable delivery fuel pump or a spill valve so as to increase the fuel flow to the engine. The resultant response of the diaphragm 36 to acceleration of the engine at first causes the link 43 to pivot about its pivot 44 without re-opening the valve 47, until the collar 89 on the rod 88 coacts with the upper stop 91. Thereafter further action of the acceleration component on the diaphragm 36 actuates the lever 45 to open the valve 47. The stops 91 act in precisely similar fashion on selection of a lower speed to limit the degree of deceleration which can be produced before the valve 47, which opens on selection of a lower speed, can be closed.

The stops 91 thus restrict the acceleration or deceleration obtainable, permitting an initial movement of the acceleration-responsive diaphragm 36, before the valve 47 is affected, which varies with the actual engine speed.

It is believed that, for gas turbine engines, the desideratum is that the maximum acceleration should be directly proportional to the speed. This can be achieved by using a square law spring for loading the diaphragm 95 in opposition to the pressure differential acting on it, which, of course, is proportional to the square of the speed. Alternatively it may be achieved by using a constant rate spring and by suitable shaping of the needle 94 attached to the diaphragm 95. By giving another shape to this needle 94 a different desired relationship between maximum acceleration and engine speed can be obtained.

The maximum acceleration for any given speed may need to be altered with variations in air intake pressure. This is provided for in Fig. 6 by a pressure sensitive capsule 97 operating a needle 98 which controls an orifice in a spill line 99 from the upper side of the diaphragm 95 and so, depending on the size of the restriction in the spill line 99, adjusting the position of the needle 94 and therefore of the stops 91.

In the arrangement shown in Fig. 7, a single diaphragm 34, responsive both to speed and acceleration, is used to operate the control valve 47. The override device is constituted by a free floating piston 100 having a bleed orifice 101 and loaded by springs 102 against movement in either direction in the servo cylinder 52. With such an arrangement the servo piston 51 and free piston 100 move together during their initial travel. When, however, the free piston 100 has moved to the limit permitted by its springs 102 and is arrested, by one or other of a pair of stops 103, further movement of the servo piston 51 is retarded due to the restriction to flow imposed by the bleed orifice 101 in the free piston 100. The servo piston 51 in this case will be coupled to a specially shaped needle valve, not shown, the shape of which will govern the maximum possible enrichment or weakening of the mixture supplied to the engine.

An alternative form of governor will now be described, first with reference to the diagram in Fig. 9 and to the practical embodiment shown in Figs. 15–22. Reference characters other than those used in Figs. 1–7 are employed to designate the parts of the alternative form of governor described with reference to Figs. 9–22. Like reference characters, however, denote like parts throughout these figures.

Referring first to Fig. 9, fuel from a tank 10 is fed, through a normally open cut-off valve 11, to a pressure line 104 by a gear pump 105 and thence, through a pressure boost valve 106, to a line 109 leading to the burner ring of a gas turbine. Fuel from a starter boost pump may be introduced into the system for starting purposes, along a line 110 and through a non-return valve 111. Line 109 is also connected to a normally closed dump valve 108. By operation of a linkage 112, a normally open engine stopping valve 107 and the normally closed dump valve 108, can be moved, from the positions shown, to a position in which the valve 107 closes line 109 and allows fuel from the pump 105 to be returned to the suction side of the pump via a line 113, and the valve 108 connects the line 109 to a dump line 114, so allowing any fuel remaining in the burner ring to be spilled away.

The flow of fuel to the engine is regulated by a needle valve 115, attached to a servo piston 116, movable in a cylinder 117. The needle valve 115 allows part of the fuel from the line 104 to flow back to the suction side of the pump through a line 118 containing a spring loaded pressurising valve 119. Fuel from the downstream side of the metering needle 115 can pass, through a passage 120, to the left hand end of the servo cylinder and thence through a restricted orifice 121 in the servo piston to a line 122, the outlet from which is controlled by a control valve 123. The servo piston 116 is balanced against the liquid pressure difference across it by a spring 124, and the pressurising valve 119 ensures that the servo system will be operated by fuel at constant pressure.

Turning now to Figs. 15–22, the governor comprises a central drive shaft 125 (Fig. 16) having thereon splines 126 by means of which it may be driven. Driven by the shaft 125 is one of the gear wheels 105 of the pump. Fuel from the inlet 127 (shown in Figs. 15–17) reaches a passage 128 (Fig. 19) and is pumped by the gear wheels 105 along a passage 129 (Figs. 17 and 18) to the needle valve 115. Fuel from the pump flows, through the pressure boost valve 106 (Fig. 18) and the valves 107, 108 to an outlet 130, which will be connected to the burner ring. In Fig. 18 the inlet for connection to the starter boost pump is shown at 131. On rotation of a lever 132 (Fig. 15) external to the casing of the governor, the engine stopping valve 107 and the dump valve 108 can be moved to their alternative positions described above. Normally, fuel can flow from the pressure boosting valve 106 to the outlet 130 through a central port 135 in the valve 107 as shown in Fig. 18. When the valve 107 is rotated clockwise through 90° from the position shown in Fig. 18, liquid is passed by the pressure boosting valve 106 to a port 136 in a sleeve 134 surrounding the valve, which port is connected by a passage, 136ᵃ (see also Fig. 16), to the space 137 on the low pressure side of the pressurising valve 119. This space is connected by a passage 137ᵃ to the inlet 127. At the same time, a port 138 (Fig. 16) in the valve 107 connects the outlet 130, via a port 330 (Fig. 18) in the sleeve 134 to the space 331 (Figs. 16 and 22) surrounding an eccentric 133 on the end of the valve 107. As shown in Fig. 22, counterclockwise rotation of the valve 107 as there seen causes the eccentric 133 to lift the dump valve 108 against a spring 332, so connecting the space 331, and therefore the outlet 130, to a union 139 (see also Fig. 15) leading to the dump line.

Fixed to the shaft 125 is a cylindrical casing 140, which carries on each face a set of impeller vanes 141, which are shown in Fig. 9 as a conventional centrifugal impeller 141. For clarity in Fig. 9 the casing 140 is drawn in the same plane as the shaft 125 carrying it.

Figure 20:
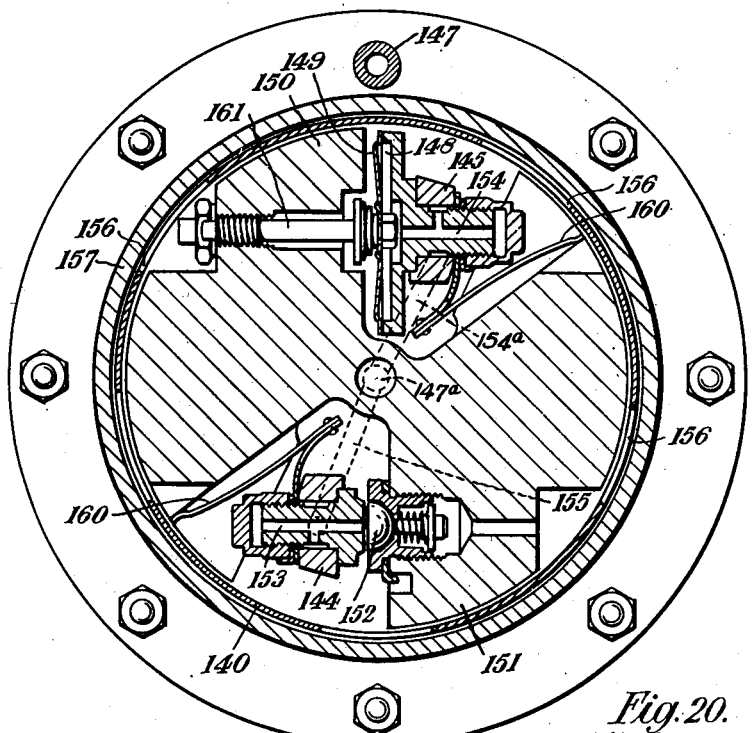

As shown in Figs. 9, 16 and 20, a fly-weight 142 of approximately dumb-bell shape is rotatably mounted within the casing 140. The fly-weight 142 is supported on pins 143 (Fig. 16) which turn in bearings in relation to the portions of the shaft 125 on opposite sides of the casing 140. The casing carries two bosses 144, 145 (Fig. 20). The casing 140 rotates anticlockwise as seen in Fig. 20 and the boss 145 has in its leading face a cavity 148 closed by a diaphragm 149 which faces the trailing edge of one limb 150 of the fly-weight. The trailing edge of the other limb 151 of the fly-weight carries a half-ball valve 152 which, when the casing 140 and fly-weight 142 are rotating at equal speeds, is spaced slightly in advance of the other boss 144 on the casing in which is an outlet 153 for fuel.

A fuel inlet passage 154 leads to the cavity 148 behind the diaphragm 149 and a passage indicated at 155 leads to the outlet 153 controlled by the half-ball valve 152. Fuel is supplied from the downstream side of the needle valve 115, through a passage 146 (Fig. 18) to one side of an acceleration responsive diaphragm 163 and thence through a pipe 147 indicated in Figs. 9, 16 and 20, to a passage 147a (Figs. 16 and 20). The passage 147a communicates with the passage 155 and also with a passage 154a leading to the passage 154. Fuel can flow through the outlet 153 into the interior of the casing 140 and thence, through holes 156 in the casing, to an annular space in the housing 157 surrounding the casing, which space is subject to impeller tip pressure. The impeller tip pressure is applied, through a pipe 158 (Fig. 16) to a speed responsive diaphragm 162 as later described. The eye of the impeller 141 is connected to the inlet by a passage indicated at 159 in Figs. 9 and 16. Springs 160 interposed between the leading edge of each limb of the fly-weight 142 and the trailing edge of the adjoining boss normally maintain a rod 161 carried by the fly-weight 142 in contact with the diaphragm 149 and establish a datum hydraulic pressure difference across the diaphragm.

If the engine accelerates, the fly-weight 142 will lag behind the casing 140 and the effective area of the outlet 153 will be reduced, thereby causing a rise in pressure in the cavity 148 which is a measure of the acceleration. If the engine decelerates, the casing 140 will lag behind the fly-weight 142, thereby increasing the effective area of the outlet 153 and producing a decrease in the pressure in the cavity 148 which is a measure of the deceleration.

The governor controls the fuel flow through the agency of two diaphragms one, 162, responsive to speed and one, 163, responsive to acceleration. These diaphragms are shown most clearly in Figs. 18 and 21. The control valve 123 is supported on a beam 164 coupling the two diaphragms.

The fuel from the right hand end of the cylinder 117 flows through the outlet from the line 122 (Figs. 9 and 17), under control of the valve 123 and thence to the low pressure sides of the diaphragms 162, 163, the fuel returning thence to the inlet by a passage indicated at 165 in Fig. 9. The fuel from passage 146 (Fig. 9) passes through a restricted orifice 166 to the pressure sides of the diaphragm 163 and thence, through the pipe 147 already referred to, to the inlet 154 to the cavity 148. The pressure in the cavity 148 is thus applied to the acceleration responsive diaphragm 163.

The pipe 158 already referred to communicates, via an adjustable needle valve 167 (Fig. 16) fitted with a finial nut 195, and a passage 168, with the pressure side of the speed responsive diaphragm 162, so applying a proportion of impeller tip pressure to that diaphragm.

The acceleration responsive diaphragm 163 is balanced against the liquid pressure difference on it by a spring 16 (Fig. 18) the loading of which is adjustable by a screw 169 fitted with a finial nut 170. In the event of acceleration of the engine, the diaphragm 163 moves, in response to the change of pressure in the cavity 148, to open the control valve 123. It moves in the reverse direction in the event of deceleration.

The speed responsive diaphragm 162 is balanced against the liquid pressure difference across it by a spring 171, the loading of which is adjustable by means of a lever 172 (Figs. 15 and 16). This is operable from a pilot's speed control lever in the cockpit. As shown in Figs. 16 and 18 the lever 172 is fixed to a shaft 173 carrying a toothed quadrant 174 meshing with rack teeth 175 on a sleeve 176 constituting an abutment for the spring 171. Adjustable stops 177, 178 fitted with finial nuts 179, 180 coact with the quadrant 174 to limit the movement which may be imparted to the lever 172. The diaphragm 162 serves to open the control valve 123 in response to increase in engine speed and to close it in response to decrease in engine speed. The rate of the spring 171 is proportional to the selected speed, so that the sensitivity of the governor is substantially constant over the whole speed range. Adjustable stops 181, 182 fitted with finial nuts 183, 184 are provided opposite each face of the speed responsive diaphragm 162, these serving to set the maximum positive and negative values of the acceleration of the engine.

The half-ball control valve 123 is supported on a housing 185 of rectangular shape and forming a seating for the valve 123. A spring 186, acting on a collar 187 on the valve, holds the valve 123 on its seating. A spring plate 333 (Fig. 17) riveted to the housing 185 is fixed under side plates 188 and serves to restrain the beam 164 against transverse and fore and aft movement. The housing 185 is rotatable on trunnions 189 (Fig. 17) carried by the beam 164 about an axis transverse to the length of the beam.

At one end, the beam 164 carries a thin spring plate 193 by which it is attached to the diaphragm 162, the plate 193 being held under constant tension by a spring 191. At its other end the beam 164 carries a pin 190 which abuts against a projection 334 on the diaphragm 163, a spring 192 being interposed between the beam 164 and the diaphragm 163.

When a higher speed is selected, the speed responsive diaphragm 162 is moved, by the increased load imparted to its spring 171, until arrested by the adjustable stop 181. This, through the agency of the spring plate 193, rocks the beam, anticlockwise as seen in Fig. 18, to close the control valve 123 and also to increase the load on the spring 16 associated with the acceleration responsive diaphragm 163. Application of acceleration pressure to the diaphragm 163 will only cause the beam 164 to move in the direction to reopen the control valve 123 when the additional load so placed on the spring 16 has been overcome. The other stop 182 serves to limit the initial movement of the speed responsive diaphragm 162 when a lower speed is selected.

By adjustment of the needle 167, the desired relationship between speed and acceleration pressures may be maintained notwithstanding manufacturing errors in the unit, changes in specific gravity of the fuel and changes in drive ratio between the engine and the governor unit.

The governor, shown in Fig. 9 and in Figs. 16–22, may, like those of the fly-wheel type previously described, in certain cases need to be fitted with an override to prevent over-fuelling on acceleration and/or flame extinction on deceleration. This override may be of any of the following types:

(a) When the servomotor, instead of operating a metering needle to spill back to the suction side part of the delivery of a fixed delivery pump, varies the fuel flow by adjusting a variable delivery pump, a stop could be incorporated in the pump to limit its maximum or minimum delivery. The position of this stop could be arranged to vary automatically with changes in R. P. M., air intake pressure or other variable factors.

(b) A fuel-air ratio control could be arranged to limit the maximum and minimum delivery of the fuel pump to values dependent upon the weight of air passing through the engine at any given time.

(c) A control unit could vary the position of the stops 181, 182 for the speed responsive diaphragm 162 in accordance with changes in R. P. M., air intake pressure or other variable factors so providing varying values for the maximum and minimum acceleration.

(d) A control unit could measure the amount of fuel passing to the engine, e. g. by measuring burner ring pressure, and limit the maximum and minimum amount supplied in accordance with changes in R. P. M., air intake pressure or other variable factors.

(e) A control unit could measure the engine acceleration and equate it to some pressure which varies with R. P. M., air intake pressure or other variable factors so providing varying values for the maximum and minimum acceleration.

In cases (b), (d) and (e) the override may comprise an override valve or valves in parallel with the control valve 123 of the servomotor, the override valve being opened at a predetermined point to allow fuel to spill from the fuel line 122 leading from the low pressure side of the servo cylinder, thus arresting the progress of the fuel-metering needle 115 in the direction to increase the flow of fuel to the engine. Thus a spill line 194, Fig. 9, may be provided for allowing fuel to spill from the line 122 when the override valve (not shown in Fig. 9) opens. The spill line may be connected to the governor shown in Figs. 15–22 by means of an outlet 196 (Fig. 18) which is there shown plugged by a screw 197.

One specific form of override mechanism for overriding the normal action of the governor described above with reference to Figs. 9 and 15–22 is shown in Figs. 13 and 14. This is intended for torque converting devices and at such times as the freely driven member tends to overspeed, the override which is driven by the free member reduces the fuel supply to the engine, thus overriding the speed selection of the main governor.

The override comprises a housing 198 containing a shaft 199 fitted with splines 200 by means of which it may be driven at some fraction or multiple of engine speed. To the shaft 199 is fixed a fly-weight cage constituted by a pair of plates 201 joined by a bridge piece 202. An inlet 203, for connection to the spill line 194 conducts fuel via a passage 204 (Fig. 13), an annular groove 204ª and a passage 204ᵇ (Fig. 14) to an outlet 205, normally closed by a half-ball valve 206. Pivoted at 207, 208 to the fly-weight cage are two bob-weights 209, 210.

Freely mounted in the centre of the cage is a fly-weight 211 which carries the half-ball control valve 206. This is normally maintained in position to close the outlet 205 due to the pressure of a spring 212 located between the fly-weight 211 and the bridge piece 202. Tails 213, 214 on the bob-weights 209, 210 bear against the fly-weight 211 and urge it in the direction to compress the spring 212. When the unit is rotated this spring 212 tends to be compressed (1) by a force caused by the tendency of the bob-weights 209, 210 to fly outwards, and (2) by a force (during acceleration) caused by the inertia of the flyweight 211. This unit is, therefore, fully mechanical. The opening of the control valve 206, which occurs when the sum of the centrifugal and inertia forces reaches a value equal to the spring setting, allows fuel to flow from the inlet 203 connected to the spill line and through the valve to an outlet 313 connected to the suction side of the pump. This results in a rapid reduction of pressure at the low pressure end of the servo cylinder 117 (Fig. 9) and consequent movement of the piston 116 and metering needle 115 to reduce the delivery of the pump. When the speed and/or acceleration drop to a given value, the valve 206 closes again and the main governor unit resumes control over the engine speed.

Reference has been made above to the desirability of providing an override, for preventing over-fuelling during acceleration, which will measure the engine acceleration and equate it with some pressure that varies with R. P. M., air intake pressure or other variable features, so providing varying values for the maximum and minimum acceleration. Such an override is shown in Fig. 12, which is a replica of Fig. 9 but with the override added. This override includes an override valve 214 in parallel with the half-ball control valve 123, which opens when the pressure developed across a diaphragm 217 by the acceleration component of the controlling pressure developed by the governor exceeds a value dependent on (a) a fixed minimum, (b) a value proportional to the square of the engine R. P. M. and (c) pressure in the engine nacelle. These values are shown graphically in Fig. 11.

The override valve 214 normally closes an outlet 215 from the spill line 194. The seating 216 for the valve 214 is attached to the diaphragm 217, which is subjected on its upper face, through a line 218, to the acceleration pressure acting on the acceleration responsive diaphragm 163. A line 219 connects the space beneath the diaphragm 217 to the return line 165. The diaphragm 217 is biassed by a spring 220, the strength of which decides the minimum value of acceleration pressure at which the diaphragm 217 will move down to open the override valve 214.

A second diaphragm 221 is subject, on its lower surface and through line 222, to the pressure at the tip of the impeller 141, and a spring 223 biasses the diaphragm 221 so that at low speeds, an extension 224 of the diaphragm 221 is maintained out of contact with the seating 216.

The characteristics of the governor override shown in Fig. 12 are illustrated in Figs. 10 and 11.

The speed of the engine, at time $t$, is given by the formula $$\frac{dn}{dt} = S_s - KAe^{-Kt}$$

where $S_s$ is an initial speed and $A$ and $K$ are constants. The acceleration, at time $t$, is consequently $$\frac{d^2n}{dt^2} = K^2 Ae^{-Kt}$$

The curves in Fig. 10 show acceleration and speed error plotted against time, the right hand ordinates showing acceleration $x.1/B$.

Fig. 11 shows graphically the operation of the governor and override of Fig. 12. The curves given show the relationship between unit acceleration and unit R. P. M. at various altitudes, the override valve 214 opening to restrict the acceleration as indicated by the line PQ. As will be seen, the override limits the acceleration to the value OP, i. e., 70 R. P. M./sec., until the speed has reached, in the case of sea level static condition, a value R, in the case of static condition at 10,000 ft. a value S, in the case of static condition at 20,000 ft. a value T and so on.

The strength of the spring 223 determines the engine speed at which the differential pressure across the diaphragm 221 begins, by raising the diaphragm 221, to oppose the differential pressure across the diaphragm 217, thereby increasing the acceleration at which the override valve 214 will open.

In order that the limit of acceleration may be reduced as the nacelle pressure decreases at altitude, the full speed responsive pressure differential developed by the governor across the speed responsive diaphragm 162 is reduced by the introduction of a needle orifice 225, controlled by a needle 226, in the line 222 and the provision of a hole 227 in the diaphragm 221 through which fuel may spill to the line 219.

Variations in nacelle pressure (i. e., static and ram), applied through an inlet 228, alter the length of an evacuated capsule stack 229 which, through a linkage 230, moves the needle 226 to alter the percentage of the full speed sensitive pressure differential which is applied to the diaphragm 162. It will be seen that as the altitude increases, the capsule stack 229 will expand to reduce the effective area of the outlet 225. This will cause a reduction in the proportion of the speed pressure component applied to the diaphragm 221 and so render the diaphragm 217 effective to open the override valve 214 at a lower limit of the acceleration.

It will be noted that the whole of the needle operating mechanism is immersed in the fuel, admitted through an orifice 231 to the space between a pair of diaphragms 232 exposed at their outer surfaces to nacelle pressure, in order to remove the pressure drop across the needle guide and any need for seals on the needle 226 which would create hysteresis. The effect of the pressure differential between the fuel and the nacelle on the evacuated capsule is negatived by the use of the two diaphragms 232. An adjustable pivot 233 serves to adjust the linkage 230 so as to vary the effective rate of the capsule stack 229, and an adjustment screw 234 serves to adjust the needle datum.

What we claim as our invention and desire to secure by Letters Patent is:

1. A hydraulic governor, comprising a shaft adapted to be driven by a body to be governed, a vane fixed to the shaft, a flywheel free on the shaft and having therein a liquid-filled cavity accommodating the vane, the vane being normally maintained central in the cavity, a pressure inlet which is arranged to open, on acceleration of the shaft, to apply pressure to the portion of the cavity in advance of the vane, a pressure sensitive device exposed to liquid pressure in the cavity so as to be subjected to a component of hydraulic pressure which increases with the speed of the shaft and to a further component of hydraulic pressure which increases with the acceleration of the shaft, a spring for normally maintaining said pressure sensitive device in neutral position against the action of the hydraulic pressure, means, responsive to movement of the pressure sensitive device from neutral position, for effecting sympathetic change in the speed of the governed body, and a manually operable speed-selecting member for varying the load applied by the spring to the pressure sensitive device.

2. A governor as claimed in claim 1, wherein the vane projects from both sides of the shaft, wherein diametrically opposite portions of the cavity in the flywheel are connected with one another and wherein springs operate to balance both wings of the vane against the hydraulic pressure difference acting thereon.

3. A hydraulic governor, comprising a centrifugal impeller arranged to be driven by the governed body, a casing mounted to rotate with the impeller, a weight freely rotatable within the casing, a diaphragm supported by the casing and enclosing behind it a cavity in the casing, an inlet for the flow of pressure liquid to said cavity, an outlet in the casing for allowing liquid to flow from the cavity to the interior of the casing and thence to exhaust, a valve operable on relative movement of the weight and casing to decrease the effective area of the outlet during periods of acceleration and to increase it during periods of deceleration, a spring between the weight and casing for establishing a datum hydraulic pressure difference across the diaphragm, and mechanism responsive jointly to the impeller tip pressure and to the pressure in the cavity for adjusting the speed of the governed body so as to counteract changes in said pressures.

4. A governor as claimed in claim 3, in which the speed adjusting mechanism comprises a servomotor for regulating the speed of the governed body, a control valve for the servomotor, a speed responsive diaphragm subject to the impeller tip pressure and balanced against it by a spring, an acceleration responsive diaphragm subject to the pressure in the cavity and balanced against it by a spring, and a beam carrying the control valve, said diaphragms being pivoted to opposite ends of said beam.

5. A governor as claimed in claim 4, comprising a speed selecting member which is operable to vary the load on the spring of the speed responsive diaphragm.

6. The combination, with a variable speed governed body, if a servomotor, comprising a control valve and a servo member movable under the control of said control valve to adjust the speed of the governed body, a pressure sensitive device coupled to said control valve, spring means loading said pressure sensitive device, a hydraulic governor driven by said governed body, conduits between said governor and said pressure sensitive device for applying to said pressure sensitive device a hydraulic pressure difference developed by said governor and acting in opposition to said spring means, said hydraulic pressure difference comprising a component varying with the speed of said body and increasing with increase in said speed and another component varying with the acceleration of said body and increasing with increase in said acceleration, and a manually operable speed selecting member coacting with said spring means and operable to vary the load exerted thereby on said pressure sensitive device, said spring means and said pressure difference normally maintaining said control valve in a neutral position and said pressure sensitive device being operative, in response to changes in the load of said spring means or in said pressure difference, to move said control valve in opposite directions from its neutral position and thereby to cause corresponding movement of said servo member to cause said body to run at the speed selected by said speed-selecting member.

7. The combination, with a variable speed governed body, of a servomotor, comprising a control valve and a servo member movable under the control of said control valve to adjust the speed of the governed body, a diaphragm coupled to said control valve, a spring loading said diaphragm, a hydraulic governor driven by said governed body, conduits connecting said governor to opposite sides of said diaphragm, said governor being effective through said conduits to apply to said diaphragm, a hydraulic pressure difference acting in opposition to said spring and comprising a component varying with the speed of said body and increasing with increase in said speed and another component varying with the acceleration of said body and increasing with increase in said acceleration, and a manually operable speed selecting member coacting with said spring and operable to vary the load exerted thereby on said diaphragm, said spring and said pressure difference normally maintaining said control valve in a neutral position and said diaphragm being operative, in response to changes in the load of said spring or in said pressure difference, to move said control valve in opposite directions from its neutral position and thereby to cause corresponding movement of said servo member to cause said body to run at the speed selected by said speed-selecting member.

8. The combination, with a variable speed governed body, of a servomotor, comprising a control valve and a servo member movable under the control of said control valve to adjust the speed of said governed body, a pair of diaphragms linked to said control valve, means controlled by said governed body for applying to one of said diaphragms a hydraulic pressure difference which increases progressively with the speed of said body, means controlled by said governed body for applying to the other of said diaphragms a hydraulic pressure difference which increases progressively with the acceleration of said body, a spring associated with each diaphragm for exerting a load thereon in opposition to the hydraulic pressure difference acting thereon, and a manually operable speed-selecting member for varying the load of the spring acting on the diaphragm subjected to the speed-responsive hydraulic pressure difference, said diaphragms normally maintaining said control valve in neutral position, the speed responsive diaphragm being operative, on actuation of the speed-selecting member to increase the speed, to move said control valve and thereby to effect corresponding movement of the servo member to increase the speed of the governed body, and the other diaphragm being effective, in response to acceleration of said governed body, to return said control valve towards its neutral position.

9. A combination as claimed in claim 8, comprising a lever pivoted intermediately of its length on a fixed pivot and carrying said control valve at one end, a link connected at its opposite end to the diaphragm and pivoted intermediately of its length to the other end of said lever, and a pair of stops coacting with the speed responsive diaphragm and operative to limit the movement, in either direction, which said acceleration responsive diaphragm may impart through said link to said speed responsive diaphragm.

10. In combination as claimed in claim 9, comprising a third diaphragm responsive to speed of the governed body and coacting with said stops to move them to increase, as the speed increases, the movement which can be imparted to said speed responsive diaphragm by said link.

11. A combination as claimed in claim 10, in which said stops are constituted by a pair of scissor links and comprising a collar attached to the speed responsive diaphragm and disposed between the prongs of said links, a needle attached to the third diaphragm and a spring between the links for holding the other ends of the links against the needle.

12. A combination as claimed in claim 10, comprising a device responsive to changes in ambient air pressure and operative on said third diaphragm to actuate it, in response to increase in ambient air pressure, to position said stops to permit of greater movement of the speed responsive diaphragm by said link.

13. A combination as claimed in claim 8, comprising adjustable stops for limiting the movement of said speed responsive diaphragm in both directions in response to adjustment of the loading of its spring by the speed selecting member.

14. A combination as claimed in claim 6, wherein the servomotor comprises a servo piston, movable to various positions in a servo cylinder under control of the control valve and operative to vary the speed of the governed body, and a floating piston, having in it a bleed orifice, the floating piston also being disposed within the servo cylinder and loaded by springs against movement in either direction in the servo cylinder.

15. A hydraulic governor, comprising a shaft adapted to be driven by a body to be governed, a vane fixed to the shaft, a flywheel free on the shaft and having therein a liquid-filled cavity accommodating the vane, the vane being normally maintained central in the cavity, a pressure inlet which is arranged to open, on acceleration of the shaft, to apply pressure to the portion of the cavity in advance of the vane, a pressure sensitive device exposed to liquid pressure in the cavity so as to be subjected to a component of hydraulic pressure which increases with acceleration of the shaft, a centrifugal impeller arranged to be driven with the shaft and to exert on said pressure sensitive device a component of hydraulic pressure which increases with the speed of the shaft, a spring for normally maintaining said pressure sensitive device in neutral position against the action of the hydraulic pressure, means, responsive to movement of the pressure sensitive device from neutral position, for effecting sympathetic change in the speed of the governed body, and a manually operable speed-selecting member for varying the load applied by the spring to the pressure sensitive device.

16. A combination as claimed in claim 6, comprising a normally closed override valve in parallel with the control valve of the servomotor and mechanism, responsive to acceleration of the governed body, coacting with said override valve and operative, in the event of the acceleration exceeding a given limit, to open the override valve.

17. A combination as claimed in claim 16, comprising a flyweight cage driven by the governed body and including an outlet for liquid from a spill line communicating with the high pressure side of the control valve, a flyweight within the cage which is freely rotatable on the shaft and carries the override valve, and a spring interposed between the cage and the flyweight and serving as a driving connection between the cage and flyweight which normally maintains the override valve in position to close the outlet.

18. A combination as claimed in claim 17, comprising a bob weight pivoted to the cage and coacting with the flyweight to rotate it in relation to the cage, to open the outlet when the speed of rotation of the cage exceeds a given limit.

19. A combination as claimed in claim 6, comprising a normally closed override valve in parallel with the control valve of the servomotor, a first spring loaded diaphragm, a first conduit for subjecting said diaphragm to the acceleration responsive component of pressure developed by the governor, a spill line communicating with the high pressure side of the control valve, said diaphragm tending to maintain said override valve in position to close an outlet from said spill line, a second spring loaded diaphragm, and a second conduit for subjecting said second diaphragm to the speed responsive component of pressure developed by the governor, said second diaphragm coacting with said first diaphragm to offer, as the speed of the governed body increases, a progressively increasing resistance to movement of said first diaphragm to position to open said outlet.

20. A combination as claimed in claim 19, comprising an outlet from said second conduit, a needle valve controlling said outlet, and a device responsive to changes in atmospheric pressure coupled to said needle valve and effective to move it in the direction to decrease the effective area of said outlet as the altitude increases.

21. The combination, with a variable speed governed body, of a servomotor, comprising a control valve and a servo member movable under the control of said control valve to adjust the speed of the governed body, a pressure sensitive device coupled to said control valve, a shaft driven by said governed body, a flywheel mounted to rotate freely in relation to said shaft, a member fixed to said shaft and defining with said flywheel an enclosure containing liquid, means for subjecting said pressure sensitive device to variations in hydraulic pressure in said enclosure occasioned by relative movement of said flywheel and member in response to acceleration of the shaft, means for subjecting said pressure sensitive device to a component of hydraulic pressure which varies with the speed of rotation of the shaft, spring means acting on said pressure sensitive device in opposition to the hydraulic pressure thereon, and a speed-selecting member coacting with said spring means and operable to vary the load applied by said spring means to said pressure sensitive device, said pressure sensitive device being operative, in response to change in the load of said spring means or in the hydraulic pressure acting thereon, to displace said control valve and thereby to effect corresponding movement of said servo member to cause said body to run at the speed selected by said speed-selecting member.

22. The combination, with a variable speed governed body, of a servomotor, comprising a control valve and a servo member movable under the control of said control valve to adjust the speed of the governed body, a first diaphragm coupled to said control valve, a spring loading said first diaphragm, a hydraulic governor driven by said governed body, conduits connecting said governor to opposite sides of said first diaphragm, said governor being effective through said conduits to apply to said diaphragm a hydraulic pressure difference acting in opposition to said spring and comprising a component varying with the speed of said body and increasing with increase in said speed and another component varying with the acceleration of said body and increasing with increase in said acceleration, a manually operable speed selecting member coacting with said spring and operable to vary the loan exerted thereon by said first diaphragm, said spring and said pressure difference normally maintaining said control valve in a neutral position and said first diaphragm being operative, in response to changes in the load of said spring or in said pressure difference, to move said control valve in opposite directions from its neutral position and thereby to cause corresponding movement of said servo member to cause said body to run at the speed selected by said speed-selecting member, a second diaphragm, conduits for applying to said second diaphragm from said governor a hydraulic pressure difference which increases with acceleration of the governed body and is independent of the speed thereof, and a member coupled to said second diaphragm and operative on said first diaphragm, on acceleration of said governed body, to return said control valve towards its neutral position.

WILLIAM D. McCOURTY.
STANLEY R. TYLER.

REFERENCES CITED

The following references are of record in the file of this patent:

UNITED STATES PATENTS

| Number | Name | Date |
|---|---|---|
| 1,509,695 | Volet | Sept. 23, 1924 |
| 2,358,894 | Volet | Sept. 26, 1944 |
| 2,364,116 | Whitehead | Dec. 5, 1944 |
| 2,374,844 | Stokes | May 1, 1945 |
| 2,386,110 | Hagemann | Oct. 2, 1945 |
| 2,407,115 | Udale | Sept. 3, 1946 |
| 2,407,982 | Hanna et al. | Sept. 24, 1946 |
| 2,438,662 | Greenland | Mar. 30, 1948 |
| 2,500,478 | Warren | Mar. 14, 1950 |
| 2,514,674 | Schorn | July 11, 1950 |